Sept. 20, 1966 R. M. PAGE 3,274,594

SIGNAL INTEGRATING RADAR SYSTEM

Filed Dec. 27, 1949 3 Sheets-Sheet 1

Inventor
ROBERT M. PAGE

By M. O. Hayes

ATTORNEY

INVENTOR
ROBERT M. PAGE

BY M. O. Hayes
ATTORNEY

Inventor
ROBERT M. PAGE

By M. A. Hayes
ATTORNEY

United States Patent Office 3,274,594
Patented Sept. 20, 1966

3,274,594
SIGNAL INTEGRATING RADAR SYSTEM

Robert M. Page, Camp Springs, Md.
(6715 Norview Court, Springfield, Va. 22150)

Filed Dec. 27, 1949, Ser. No. 135,215
20 Claims. (Cl. 343—17.1)

The invention described herein may be manufactured and used by or for the Government of the United States of America for governmental purposes without the payment of any royalties thereon or therefor.

This invention relates to impulse receiver systems in general and in particular to impulse locator systems such as sonar or radar having narrow bandwith intermediate frequency amplifiers.

In electrical systems designed to handle pulse type energy wherein the pulses exist for very short periods of time it has been general practice to employ wide bandwidth amplifier circuits to retain energy contained in short duration pulses. The necessity for wide bandwidth amplifiers for short duration pulsed operation is brought about by the general relationship which requires that a circuit operating with a pulse type wave form must have a bandwidth at least equal to twice the reciprocal of the duration of the pulses to reproduce the modulation components of the pulses accurately without unduly rounding the corners thereof or generating spurious damped oscillations following each pulse. Such bandwidth requirements are quite widely appreciated and it is with these requirements in mind that pulse type equipment is ordinarily designed. A serious difficulty at once appears in a circuit having wide bandwidth response characteristics because a wide bandwidth circuit is responsive to noise or interfering signals over a wide frequency range. With such wide bandwidth circuits even small amounts of energy present at frequencies widely separated from the center frequency of the circuit may interfere seriously with response to wanted signals.

A typical illustration of bandwidth requirements may be considered wherein operation with pulses of one microsecond duration is desired. Twice the reciprocal of this period is two million which means that the circuits handling this pulse must have a bandwidth of at least two megacycles to accurately reproduce the pulse.

It is accordingly an object of the present invention to provide a method of reducing the bandwidth requirements of certain amplifier stages in a pulse type receiver to reduce the sensitivity thereof to signals of unwanted frequency.

Another object of the present invention is to provide a new and improved impulse receiver system offering greatly improved signal to noise characteristics.

Another object of the present invention is to provide means for increasing the duration of received pulse type signals to reduce the bandwidth requirements for faithful reproduction thereof.

Other and further objects and features of the present invention will become apparent from the following detailed description when taken in conjunction with the accompanying drawings in which.

Figure 1:
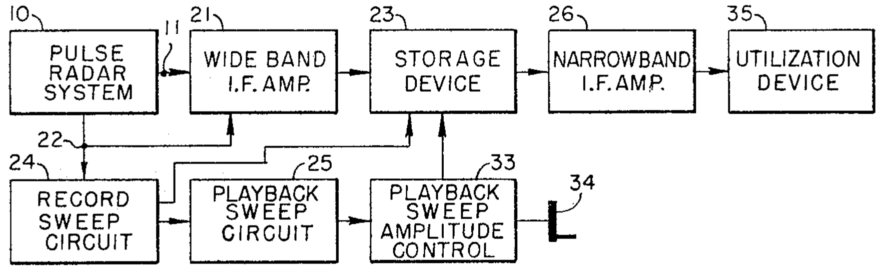
FIG. 1 shows in block form a basic embodiment of the features of the present invention.

In accordance with the fundamental concepts of the present invention bandwidth reduction of pulse type signals is accomplished by storing the radio frequency carrier or an intermediate frequency derivative thereof of the received signals returned from successively emitted pulses and playing back these signals in rapid succession with a very minimum of time spacing therebetween. Such operation places successive echo pulses in a substantially uninterrupted time sequence and when this is done with a condition of phase correspondence existing between the carrier waves of successive pulses so that signal variations introduced in a narrow bandwidth amplifier circuit by one signal will be continued and reinforced by a succeeding signal, the effect will be that of lengthening the duration of the pulse and hence reducing the bandwidth required for amplifier reproduction thereof. Using an example of pulses of one microsecond duration, a repetition frequency of a thousand per second may be selected. If each pulse is stored during its one microsecond existence and played back so as to occupy one millisecond of time, a substantially continuous signal will result. Since this signal is of a continuous nature it may be applied to an amplifier having a very narrow bandwidth which is inherently less responsive to noise than an equivalent wide bandwidth amplifier for short duration pulses.

Alternately the basic concepts of the present invention also envision a condition of operation in which a plurality of received signals occurring over a period of time are stored so that they exist on a record simultaneously. The received signals returned in response to successive transmitter pulses which are thus co-existent may then be played back one immediately following the other to effect a lengthening of the original pulse duration period and hence reduce the bandwidth requirements. Where this alternate form of operation is desired the signal addition process may be continued for as much time as is available for integration. This available time is determined by the speed of response desired for the overall system. As an illustration, a reasonable value of available time might be one-half second. If the pulse recurrence frequency is one thousand pulses per second then in this available time, 500 pulses will be stored. With each pulse as transmitted having a duration of one microsecond then the stored record consists of 500 one-microsecond signal pulses. If the speed of playback of the recorded signals is the same as for writing, the resulting play back signal will be a single pulse of 500 microseconds duration. The resulting bandwidth required for faithful reproduction of the pulse will be only four thousand cycles per second. This means that the frequency spectrum occupied by the signal has been reduced from two megacycles to four kilocycles per second. This reduction of the amplifier bandwidth by the factor of 500 to 1 provides a corresponding 500 to 1 reduction in the noise energy without loss of signal energy.

In FIG. 1 of the drawings is shown in block diagram a basic embodiment of the principles of the present invention. Block 10 is a pulse radar system providing pulse to pulse coherence in the intermediate frequency output signal at terminal 11. In pulse radar systems of this type such as the commonly known MTI or moving target indicator systems, all successive output pulses at intermediate frequency as obtained from an object at a certain range start with the same relative phase angle.

A second kind of pulse radar system in which successive signals returned from an object at fixed range possess "coherence," or start with the same relative intermediate frequency phase angle is described in my copending application Serial Number 114,450, entitled "Radar System" filed September 7, 1949. Since the apparatus of this copending application possesses many features which are particularly desirable in conjunction with the present invention, FIG. 2 has been included to illustrate briefly the features thereof. It should be borne in mind however that the apparatus of the present invention is not limited to combination with the specific pulse radar set as exemplified in FIG. 2 but may be used with any type of pulse radar or sonar set in which pulse to pulse coherence at intermediate frequency or at carrier frequency is maintained.

Figure 2:
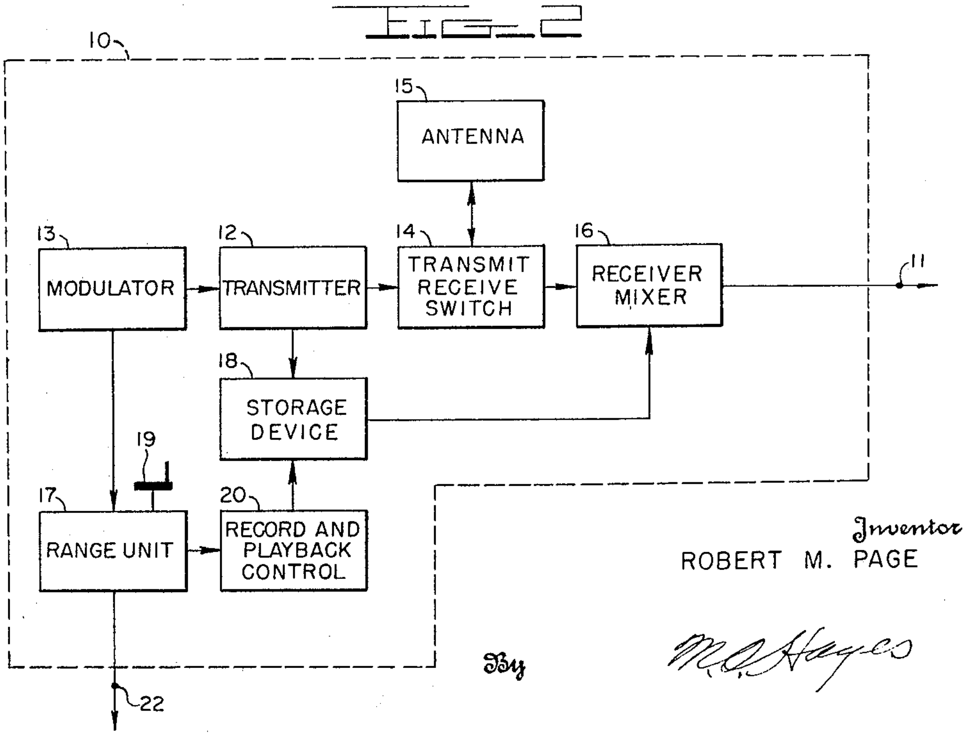
FIG. 2 shows in block form details of a typical pulse radar system as employed in FIG. 1.

With reference now to FIG. 2 of the drawings, the pulse radar system shown therein generates pulses of radio frequency energy, stores a part of each pulse of generated energy cycle by cycle, and emits the rest of the generated energy in a narrow beam. Emitted energy from each pulse which is reflected by a distant object is mixed with the stored signal from the same pulse to obtain an intermediate frequency signal. This operation is provided by the transmitter 12 which generates pulses of radio frequency energy at a repetition rate controlled by the modulator 13, the transmit-receive switch 14, antenna 15, receiver-mixer 16 and range unit 17 all of which may be conventional radar components. Each pulse of transmitter energy is stored in part by a storage device 18 at the frequency generated or at an intermediate frequency derived therefrom. After selected time delay corresponding to transmit delay introduced by the travel of energy to and from a selected range which may be selected manually by range selector control 19 and under the control of the record and play back control 20, the stored transmitter signal is played back typically at a frequency somewhat different from the frequency as recorded. This play back signal is mixed with received signals in receiver-mixer 16 to provide intermediate frequency output pulse signals at terminal 11 of a high degree of stability in which all received pulse signals from the same range start in the same phase.

Referring again to FIG. 1 the intermediate frequency signals from the receiver-mixer 16 of the pulse radar system 10 as appearing at terminal 11 are supplied to the wide bandwidth intermediate frequency amplifier 21. The wide bandwidth intermediate frequency amplifier 21 may be a gated amplifier rendered sensitive to receive signals occurring only at a selected time delay with respect to the generation of pulse signals by the radar system in accordance with operation of the range unit 17 of FIG. 2 which is set to a specified range by the range selector control 19 operated manually. Range unit 17 of FIG. 2 therefore may be a delay pulse generator such as a one-shot multivibrator suitable for producing enabling pulses with selectable time delay following the generation of each pulse by the transmitter 12. These pulses are applied to the record and play back control 20 and also appear at terminal 22.

With the wide bandwidth intermediate frequency amplifier 21 thus rendered sensitive to returned signals occurring only a specific selected time interval after emission of each pulse of energy from the radar system, output signals delivered therefrom to a second storage device 23 will correspond to those produced by echo signals returned from a selected range.

Figure 5:
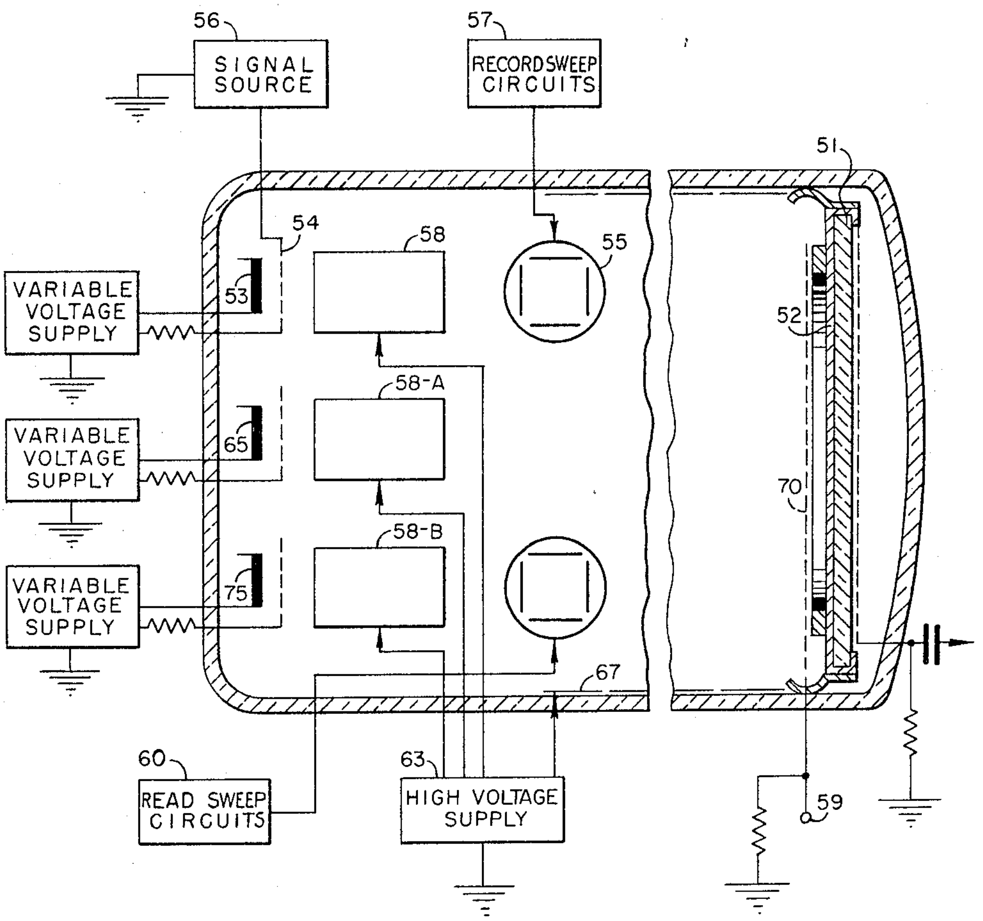
FIG. 5 shows a typical storage tube of a type useful in practicing the teachings of the present invention.

These echo signals are placed in the storage device 23 where they are retained for a finite period of time. Storage device 23 may be of any form suitable for handling information at the rate and frequency involved. Typically for radar operation it may be an electronic storage tube such as that described in the co-pending application of A. V. Haeff, Serial Number 768,790 filed October 15, 1947 entitled "Method of Storing, Maintaining and Reproducing Electrical Signals and Means Therefor," now Patent Number 2,813,998, which is shown in FIG. 5 and subsequently described briefly. For the present it is adequate to consider the storage of a signal as taking place as intensity modulation of a line of electrons on the face of a tube or indicator such as that employed in conventional radar systems but wherein the short duration received pulse signal occupies the entire length of the sweep line.

Storage of signals in this manner by the storage device 23 is accomplished through the operation of the record sweep circuit 24 which is synchronized by signals present at terminal 22. Each storage sweep is thus timed to start in coincidence with the start of each pulse echo obtained from the receiver of the pulse radar system 10 and to terminate with the termination of the radar pulse echo. Immediately following the termination of each radar pulse echo a play back sweep signal is started by the play back sweep circuit 25 which may be synchronized from the record sweep circuit 24. The length of this play back sweep signal is preferably set to occupy substantially all of the time interval between the termination of one radar pulse echo and the initiation of a succeeding radar pulse echo. Thus the play back will be substantially continuous but if desired may be interrupted momentarily during each radar pulse echo to permit storage thereof. In accordance with the typical one microsecond duration radar pulse repeated at the rate of a thousand per second the play back period will typically approach 999 microseconds and the record period will be one microsecond. As a general rule of course, the flyback time required for the sweep circuits may necessitate a reduction in the total duration of the play back sweep period however in some instances it may even be practicable or desirable to accomplish the recording operation during the flyback period for the play back sweep circuit. If recording and play back are accomplished with the same electron gun, the recording may be done on flyback of the play back sweep, thus recording and playing back in opposite directions.

Output signals from the storage device 23 obtained during the playback operation are supplied to the narrow bandwidth intermediate frequency amplifier 26 where they are sequentially integrated or added together. For this integration to mean anything so that the received signals obtained from successive transmitter pulses are additive, particular attention must be paid to the phasing of the play back signals. The successive signals must all possess in-phase relationships otherwise cancellation, rather than addition, of the energy from the successive pulses may occur.

As a general rule transmitter pulses reflected from constant range targets will all start with the same phasing but there is ordinarily nothing to insure that the phase angle at the termination of each pulse and the time lapse at the end of the play back of each recorded pulse will be such as to insure that the phase angle of the carrier waves of the integrated signal present in the narrow bandwidth intermediate frequency amplifier 26 from one signal will be in exact correspondence with carrier waves in a succeedent signal when play back of the succeedent signal is started.

Figures 3, 4, 6:
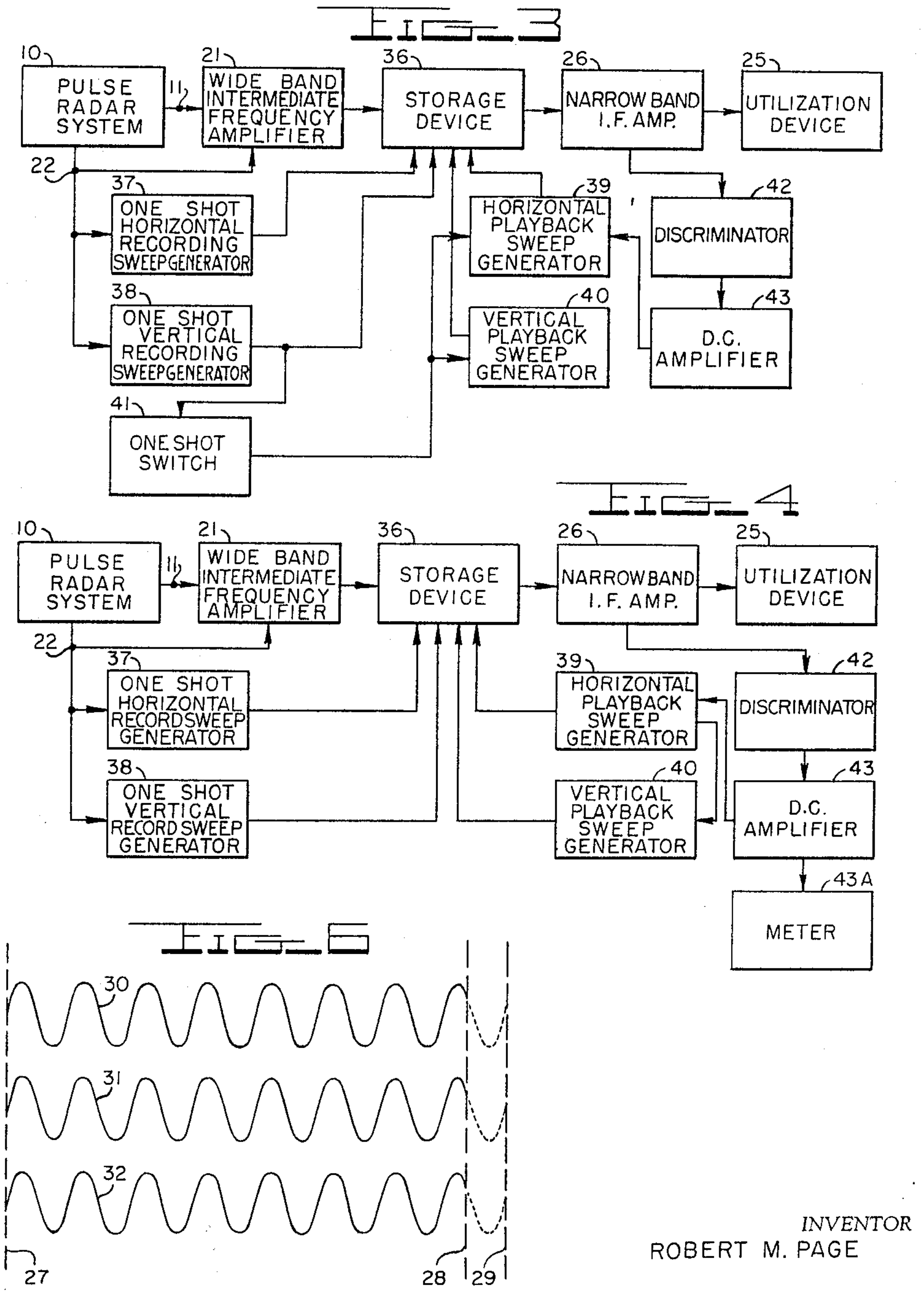
FIGS. 3 and 4 show variant embodiments of the principles of the present invention.
FIG. 6 shows particular features of signal storage and reproduction as employed in the present invention.

Phase coherence between recorded signals on play back can be brought about by close control of the play back of the stored signals. This control involves the adjustment of the play back sweep length or duration so that it occupies a length on the face of the storage tube exactly equal to a multiple of the distance occupied by one cycle of the carrier wave of the stored signal and equal to a period of time differing from the duration of the stored received signal by a small amount. To illustrate this point reference is now made to FIG. 6 which shows three stored signals. It should be understood that these signals are shown one above the other and are represented as amplitude variations for convenience whereas the signals stored on the storage device 23 in this particular embodiment in all probability would be on the same line at successive instants of time rather than simultaneously as shown and would be stored as intensity or electron concentration variations. What is indicated by FIG. 6 as a dotted vertical line 27 represents the starting point for all storage and play back sweeps. The vertical line 28 represents the end of stored pulse signals while the vertical line 29 indicates the end of play back sweeps.

In storage, the first signal 30 represents a received signal returned by a distant object responsive to a first transmitter pulse, the signal 31 represents a received signal returned by a distant object responsive to a second transmitter pulse and the signal 32 represents a received signal returned by a distant object responsive to the a third transmitter pulse. All signals are shown identical which would ordinarily be the case for a constant object range. The signals starting at the same phase (which may or may not be zero degrees as shown) and end at same random phase (typically 135° as shown). The play back period is longer than the signal period by a small amount.

In play back therefore the first stored signal 30 is scanned to deliver a signal to the narrow bandwidth intermediate frequency amplifier 26 in the interval of time the play back beam requires to travel from line 27 to line 28. When the play back beam reaches line 28 it does not fly back immediately but continues to travel from line 28 to line 29 and then returns to line 27 or experiences flyback. In the time interval represented by the time required for the beam to move from line 28 to line 29 the absence of a recorded signal between lines 28 and 29 prevents delivery of an output signal to the narrow bandwidth intermediate frequency amplifier. This signal absence has negligible effect on the signals in the tuned amplifier 26 because of its short duration and also because the tuned amplifier 26 by virtue of its natural tendency to "ring" continues the signal in a sinusoidal manner as indicated by the dotted line portion of signal 30 between the lines 28 and 29.

In the ordinary course of operation, the stored signal 30 may be erased by the play back operation itself so that the second received signal 31 can then be stored responsive to a second transmitter pulse. This signal can be stored in the interval of time represented by the spacing between lines 28 and 29 as shown or if this fraction of a carrier wave cycle is inadequate, the spacing between lines 28 and 29 may be lengthened to include some whole cycles of the carrier wave in addition to the fraction of a cycle as shown between lines 28 and 29 in FIG. 6. With the same phase angle existing at line 29 as at the initial line 27 in-phase addition of signals can occur.

It is therefore apparent that the amplitude of the play back sweep signals produced by the play back sweep circuit 25 must be closely controlled. As an illustration this may be done manually in the apparatus of FIG. 1 by means of the play back sweep amplitude control 33 having the control wheel 34 which is provided for manual manipulation. In its simplest form this play back sweep amplitude control 33 may be a potentiometer which varies the amplitude of the play back sweep signal as applied to the storage device 23. The operation of this control may be visualized with the aid of FIG. 6 as a positioning in time of the line 29 toward or away from the line 27 so that the phase angle of the continued signal at line 29 corresponds to that at the initiation of the stored signals at line 27.

Integrated signals produced by the narrow bandwidth intermediate frequency amplifier 26, which are of a substantially continuous wave nature when transmitter energy is returned by a distant object for several successive pulses, may be applied to a utilization device 35 which may be a suitable form of signal indicator. This utilization device 35 may also present in usable form the information contained in the setting of the range unit control 19 (FIG. 2) and orientation of the antenna 15 where range and bearing indication of an energy return object is desired.

In an alternate embodiment of the features of the present invention, apparatus of FIG. 3 may be employed. Components of FIG. 3 are in general similar to those of the previously described FIG. 1 except as will be noted. In accordance with the fundamental principles of this second embodiment as typified by FIG. 3 bandwidth reduction of pulse type signals is accomplished by storing the radio frequency or intermediate frequency derivative thereof of the received signals returned from successively emitted pulses over a period of time and playing back these signals in rapid succession with a very minimum of time spacing therebetween. Such operation places successive echo pulses in substantially uninterrupted time sequence with a condition of phase correspondence between successive pulses so that signal variations introduced in a narrow bandwidth amplifier circuit by one signal will be continued and reinforced by a succeeding signal, in effect lengthening the duration of the pulse and hence reducing the bandwidth required for amplifier reproduction thereof. Using the previous sample of one microsecond pulses, if two such pulses are stored and played back one immediately following the other, the effect on a succeeding intermediate frequency amplifier stage will be that of a pulse having two microseconds' duration and hence the bandwidth requirements therefor will be only one megacycle per second. This signal addition process may be continued for as much time as is available for integration. This available time is determined by the speed of response desired for the overall system as previously mentioned.

In the apparatus of FIG. 3 signals are placed on the storage device 36 as on a rectangular area of the face of an electron beam tube as in television in which the rectangular area is covered by horizontal and vertical deflection circuits for the electron beam. In this television analogy therefore each echo signal returned from a given range may be stored cycle by cycle as intensity variations of one horizontal line across the face of the storage device. A first echo signal may appear as a storage pattern on a first horizontal line at the top of the storage device. A subsequent echo signal will appear as a storage pattern on a second horizontal line immediately below it, a third signal on a third line and so on. In this manner it is seen therefore that just as in the generation of a television raster, the vertical sweep will operate at a subharmonic of the horizontal sweep and in general at a frequency equal to the reciprocal of the integration time.

Horizontal and vertical recording sweep signals for storage device 36 are provided by the horizontal and vertical recording sweep circuits in blocks 37 and 38 respectively, which are supplied by synchronizing signals from terminal 22 of the range unit 17 of pulse radar system 10 (FIG. 2).

In the typical example of this second embodiment, horizontal recording sweep generator 37 is a one-shot saw-tooth sweep generator operative synchronously with and responsive to the range gate at terminal 22 to produce a one microsecond duration saw-tooth sweep pulse during the period of reception of transmitter energy returned from selected range. Vertical record sweep generator 38 is likewise a one-shot saw-tooth sweep circuit responsive to the gate pulse at terminal 22 to produce a one-half second duration vertical saw-tooth pulse. The horizontal recording sweep circuit of block 37 is synchronized by a signal from range unit 17 (FIG. 2) to start each cycle of horizontal recording operation in coincidence with the beginning of reception of return energy from a selected range (range unit delay). It should be understood that although the amplifier 21 has previously been described as being gated by a signal from range unit 17, such gating can usually be dispensed with because the storage device 36 will only be receptive to store returned signals during the horizontal recording sweep signals and also where the installation includes a radar set such as shown in FIG. 2, because output signals from mixer 16 at terminal 11 will be present only when play back transmitter signals occur in coincidence with return signals intercepted by the radar antenna. The vertical record sweep is synchronized to operate at a submultiple of the horizontal record sweep. In this manner signal "frames," each including a plurality of stored received signals, appear on storage device 36.

In the play back operation output signals from storage device 36 are delivered to a narrow bandwidth intermediate frequency amplifier 26 under control of the horizontal and vertical play back sweep circuits 39 and 40. These play back sweep circuits may be synchronized with the record sweep circuits to scan the stored signals present on the storage device 36 in rapid ordered succession so that the signals stored typically over a ½ second period may be played back without interruption appearing as a single long duration pulse equal in duration to the total transmitter operation time in the ½ second interval.

As specifically illustrated in the drawings sweep generator 39 is preferably a controlled free-running type of saw-tooth signal generator whose operation is switched off and on by the one-shot multivibrator switch 41. The latter is connected to the vertical record sweep generator 38 and rendered operative responsive to the fly back portion of the saw-tooth signal produced thereby. During the operative period of switch 41 which is approximately 500 microseconds or slightly longer in the example given, sweep generator 39 generates one microsecond saw-tooth play back scanning signal in uninterrupted succession. Sweep generator 40 is likewise controlled by switch 41 and operates responsive thereto to produce a single vertical saw-tooth play back sweep signal of approximately 500 microseconds duration. At the end of the 500 microsecond play back period, switch 41 automatically resets itself to quench further operation of generators 39 and 40 until the end of the next record period.

The long pulse which results on play back will then have a recurrence frequency of twice a second. The frequency of this play back signal must be accurately adjusted to the frequency of response of the narrow bandwidth intermediate frequency amplifier 26, which as previously mentioned may be only four kilocycles wide. The frequency of the play back signal depends on the rate of scan of the stored signal and can be adjusted in the play back sweep circuits by varying the slope of the play back scanning signal and is trimmed in accordance with received signals by varying the amplitude of the horizontal play back sweep signals. This variation may be accomplished automatically by the frequency discriminator 42, which derives output signals dependent upon the frequency of output signals from narrow bandwidth intermediate frequency amplifier 26 as applied through D.-C. amplifier 43. Amplifier 43 in turn may be used to control the plate supply voltage, for example, of the horizontal play back sweep generator 39 or otherwise adjust the amplitude of the play back sweep signal. The amplitude of the horizontal play back signal could also be controlled by applying the sweep voltage to a variable gain amplifier the amplification of which is controlled in accordance with the D.-C. control signal from amplifier 43.

Stored signals are erased periodically to permit the storage of new information. This erasure is accomplished as will be described later by terminating a holding signal to the storage device 36 or can also be accomplished by the recording beam of the storage device itself. Regardless of the exact mechanism the main requirement is that a previously recorded group of signals be removed as new information arrives.

With this circuit arrangement a long duration output signal is delivered from narrow bandwidth intermediate frequency amplifier 26 to utilization device 25, which may typically be a cathode ray tube indicator, whenever energy is returned by an object at the selected range from the radar system for several successive radar pulse signals.

In the previous illustration of one microsecond pulses having a one thousand pulse per second recurrence frequency with available time of ½ second, the 500 microseconds required for play back of the stored 500 signals may be sandwiched in the 999 microsecond period between any two successive transmitter pulses, typically one of these pulses being the last pulse of one storage frame while the other pulse is the first pulse of the succeeding storage frame.

For proper addition of the signals returned in response to successive transmitter pulses, the same attention must be paid to the phasing of the played back signals as in the first example described in connection with FIG. 1. The same general manner of insuring such phase correspondence previously described is followed with the apparatus of FIG. 3 and may be explained in practically the same manner with the illustration of FIG. 6. It being necessary only to consider that the three signals represented on FIG. 6 are stored one after the other until all three and the 497 others in the typical illustration are simultaneously present on the storage device. Play back then takes place of all the stored signals in rapid sequence with the same time lapse between successive signals, represented by the spacing between lines 28 and 29, as before, however provision need not be made for recording a received signal between the play back of successive stored signals.

As thus far described care has been taken to assure that the reading and writing times are separate. Such separations are not always necessary and if proper precautions are taken it is possible to record at the same time as a play back operation is taking place. Where the writing and reading can take place simultaneously the horizontal and vertical writing sweeps may operate independently of the horizontal and vertical play back sweeps rather than synchronized as mentioned above.

FIG. 4 shows, fragmentarily, such a system having components thereof similar to comparable components of FIG. 3. In this embodiment no particular synchronization is maintained between the recording sweeps and the play back sweeps hence the one-shot synchronizing switch 41 of FIG. 3 is omitted. Again, however, the vertical play back and write sweeps operate at a period which is a multiple of their respective horizontal sweep components. Typically the frequency of the reading operation can bear almost any relationship desired with respect to the writing operation. As an example, the whole record, that is, the entire storage raster could be read after each successive signal is recorded. As another example of the flexibility of the system two lines could be stored while three were being played back. These are only a few of the many possible modes of operation which can be employed. Consequently the examples given are only intended to be illustrative and not limiting.

The storage tube of A. V. Haeff as previously referred to is shown in FIG. 5. This tube has an insulator plate 51 with an active surface 52 placed thereon. Typically the plate may be of glass and the active surface distributed willemite particles.

An initial charge distribution pattern representative of the transmitter pulse may be placed on the active surface 52 by an electron gun including cathode 53. The beam of this gun may be controlled by grid 54 and deflection means 55 under control of signals supplied from signal source 56. Source 56, in the case of FIG. 3 may correspond to wide bandwidth intermediate frequency amplifier 21. The beam is focused by a conventional lens electrode system shown diagrammatically at 58, for which a high voltage supply 63 is provided. The main tube anode 67 coated on the interior of the envelope, is also energized by supply 63.

Signals placed on the active surface 52 are maintained thereon by delivering low velocity electrons thereto from an electron gun including the cathode 65 and focusing lens system 58–A.

Screen 70 possessing close spacing such as 200 mesh per inch collects secondary electrons emitted from the surface 52 upon bombardment by play back scanning electrons from a play back electron gun including cathode 75 and focusing lens system 58–B. This play back scan is controlled by the read sweep circuit 60. Output signals produced from the secondary emission current to screen 70 are obtained at terminal 59 and represent the output signals delivered from the storage device 36 of FIG. 3 to narrow bandwith intermediate frequency amplifier 26. Sweep circuit 57 corresponds to the vertical and horizontal recording sweep circuits 37 and 38 of FIG. 3 whereas sweep circuit 60 corresponds to the horizontal and vertical play back sweep circuits 39 and 40.

Erasure of the stored signals is accomplished by diminishing or terminating the holding beam from cathode 65 or if desired can be accomplished by the writing beam from cathode 53 itself. The latter form of erasure is preferred.

It is to be appreciated that this storage tube employs three separate electron beam devices. A gun with such three electron beam devices will be found advantageous particularly where operation of the type discussed in connection with FIG. 4 is employed, because the probability of simultaneous recording and reading requires a minimum of two electron guns plus the holding electron gun.

Where the operation is synchronized to such an extent that reading and writing never take place simultaneously as in the embodiments of FIG. 1 and FIG. 3 a single electron gun may be employed to perform in sequence the three operations of record, play back and erase permitting a much simpler tube structure to be employed than that shown in FIG. 5. Such a single beam tube may not of necessity require a "holding" beam of electrons but may sustain the stored signal until it is "picked up" in the play back operation.

Automatic frequency control of the playback signal from the storage devices previously mentioned only briefly may well be elaborated on at greater length. In connection with the discussion of frequency discriminator 42 and D.-C. amplifier 43 of FIG. 3 it was stated that the frequency of the playback signals can be trimmed in accordance with received signals by varying the amplitude of the horizontal playback signals. In many cases such "trimming" is essential because frequency shifts of the return signals due to Doppler effect when there is relative motion between the locator system and a selected energy return object may quite easily send the signal to the edge of the passband of the narrow bandwidth amplifier 26.

Control of the amplitude of the playback signals by D.-C. amplifier 43 effectively varies the position of the dotted vertical line 29 of FIG. 6 as signals change in frequency so that the condition of a uniform number of carrier wave cycles (actual and projected) always is present between the lines 27 and 29. The discriminator 42 is quite sensitive to any change in the number of cycles between lines 27 and 29 or a variation from the whole number of cycles condition either of which could be introduced by Doppler effect because either produces a difference in the frequency of output signals from storage device 36. Where such variation in the effective position of line 29 is employed, it is of course necessary to provide sufficient spacing between lines 28 and 29 initially so that the maximum variation in position of line 29 can be accommodated. In general the slope of the playback sweep signal must vary proportionally with variations in the position of line 29 because the repetition frequency of the playback signals is ordinarily held constant. To fulfil this requirement, the D.-C. amplifier 43 providing a variation in the charging voltage for the horizontal playback sweep generator 39 is highly desirable.

When it is desired to obtain an indication of range rate for fire control or other purposes, a suitable meter 43–A may be inserted in the output of D.-C. amplifier 43.

When there is relative motion between the radar system and a selected energy reflective object, the range selector 19 in FIG. 2 must be continuously adjusted to track the energy reflective object. As shown, this is a manual operation and is performed in such a manner as to obtain a selected indication from the meter 43–A. When this range tracking rate departs from the actual range rate, the starting phase angle of successive signals recorded will change progressively from pulse to pulse. If such occurs, the discriminator 42 and D.-C. amplifier 43 will operate to cause the spacing between lines 27 and 29 to depart from a whole number of cycles by the amount of this shift in phase angle between successive signals. The effect of this departure will be to keep the output frequency centered in the pass band of the narrow band intermediate frequency amplifier 26. The operation will be accompanied by a change in the reading of the meter 43–A which change will serve to indicate that the range rate of the energy reflective object differs from the rate of adjustment of the range gate selector 19.

It is thus seen that a tremendous flexibility of operation and of selection of a storge device is available without exceeding the scope of the present invention. By and large only conventional radar circuits are required for the various components of the apparatus. From the foregoing discussion it is apparent that considerable modification of the features of this basic invention is possible without exceeding the scope thereof as defined in the appended claims.

What is claimed is:

1. A radar system comprising, transmitter means recurrently emitting short duration pulses of carrier frequency energy, receiver means intercepting return energy, radio frequency storage means retaining in a carrier frequency signal form signals returned with selected time delay after each emitted pulse, and means reproducing retained signals in carrier frequency signal form with phase coherence between successive reproduced signals.

2. A radar system comprising, transmitter means recurrently emitting short duration pulses of carrier frequency energy, receiver means intercepting return energy, radio frequency storage means retaining in a carrier frequency signal form signals returned with selected time delay after each emitting pulse, and means reproducing retained signals in carrier frequency signal form at intervals multiply related to the stored signal period.

3. A radar system comprising, transmitter means recurrently emitting short duration pulses of carrier frequency energy, receiver means intercepting return energy, radio frequency storage means retaining in a carrier frequency signal form signals returned with selected time delay after each emitted pulse, and means reproducing retained signals in carrier frequency signal form with short delay between successive reproduced signals and at signal intervals multiply related to the stored signal period.

4. A radar system comprising, transmitter means recurrently emitting short duration pulses of carrier frequency energy, receiver means intercepting return energy, radio frequency storage means retaining in a carrier frequency signal form signals returned with selected time delay after each emitted pulse, means reproducing the retained signals in carrier frequency signal form with short delay between successive reproduced signals, narrow band combining means responsive to the frequency of the carrier frequency signal for integrating reproduced retained signals, and utilization means connected to the last named means indicating the presence of additive integrated signals.

5. In an echo energy operative detection device, radio frequency means storing in a carrier frequency signal form successive short duration received signals occurring widely separated in time, means for repeatedly reproducing the stored received signals a plurality of times in the time interval separating successive short duration signals to generate signals occupying substantially the entire time spacing between the short duration signals, a narrow bandwidth combining circuit responsive to the frequency of the carrier frequency signal for combining reproduced energy, and means utilizing the combined signals.

6. In a pulse echo energy operative device for detecting the presence of distant objects, transmitter means emitting recurrent short duration pulses of cyclicly varying energy, receiver means intercepting emitted cyclicly varying energy returned by distant objects, radio frequency storage means for separately retaining as variations in a carrier frequency signal the cyclicly varying energy returned from selected range for several successive transmitter energy pulses, reproduction control means for controlling the reproduction of retained signals obtained from selected range a plurality of times in the time interval between receipt of successive returned energy signals from a selected distant object to occupy substantially the entire time interval, narrow band combining means integrating reproduced retained signals, and utilization means connected to the last named means indicating the presence of additive integrated signals.

7. In a locator system wherein short duration signals are stored in carrier frequency signal form waves and subsequently reproduced in carrier frequency signal form, range rate apparatus, comprising, a discriminator responsive to reproduced signals to produce control signals in dependency on variations in the frequency of reproduced signals from a selected center frequency, a playback sweep signal generator providing sawtooth sweep signals in amplitude dependent on a voltage supply thereto, amplifier means responsive to said control signals to vary the voltage supply to the sweep generator to increase the amplitude of said sawtooth sweep signals when reproduced signals are too low in frequency and decrease the amplitude when reproduced signals are too high in frequency, and means indicating the magnitude of the variable voltage supply to the sweep generator.

8. In a locator system wherein short duration signals are stored in carrier frequency signal form waves and subsequently reproduced in carrier frequency signal form, frequency sensitive means providing control signals in dependency on variations in the frequency of reproduced signals from a selected center frequency, a playback sweep signal generator, amplifier means responsive to signals from the frequency sensitive means to control the amplitude of the playback sweep produced by the sweep signal generator, and means indicating the magnitude of the amplified signals from the amplifier means.

9. In a pulse-echo object locator system, radio frequency storage means for storing short duration widely time-spaced received signals individually as signals having a carrier frequency, playback means for reproducing each stored signal in carrier frequency signal form throughout substantially the entire time interval between it and a succeeding signal, narrow bandwidth combining means responsive to the carrier signal frequency for sequentially integrating the energy contained in reproduced signals, and frequency measuring means connected to the output of said last named means for providing signals proportional to the frequency of combined signals.

10. In a pulse-echo object locator system, radio frequency storage means for storing short duration widely time-spaced received signals individually in carrier frequency signal form, playback means for reproducing in carrier frequency signal form each stored signal throughout substantially the entire time interval between it and a succeeding signal, narrow bandwidth combining means responsive to the carrier signal frequency for sequentially integrating the energy contained in successive reproduced signals, and a frequency discriminator deriving output signals proportional to frequency variations in combined signals.

11. In a pulse-echo object locator system, radio frequency storage means for storing short duration widely time-spaced received signals individually in carrier frequency signal form, playback means for reproducing each stored signal in carrier frequency signal form throughout substantially the entire time interval between it and a succeeding signal, narrow bandwidth combining means for sequentially integrating the energy contained in reproduced carrier frequency signals, a frequency discriminator connected to the output of said last named means for deriving output signals proportional to frequency variations in combined signals, and a control signal path connected to the frequency discriminator and to the playback means operative to control the playback means to maintain the combined signals at a selected frequency.

12. In a pulse-echo object locator system, radio frequency storage means for storing short duration widely time-spaced received signals individually in carrier frequency signal form, playback means for reproducing each stored signal in carrier frequency signal form throughout substantially the entire time interval between it and a succeeding signal, narrow bandwidth combining means for sequentially integrating the energy contained in reproduced carrier frequency signals, a frequency discriminator connected to the output of said last named means for deriving output signals proportional to frequency variations in combined signals, a control signal path connected to the frequency discriminator and to the playback means operative to control the playback means to maintain the combined signals at a selected frequency, and indicator means connected to the control signal path operative to indicate the value of playback control necessary to maintain the combined signals at the selected frequency.

13. In a pulse-echo object locator system including apparatus for periodically transmitting short duration pulses of substantially fixed carrier frequency energy and for receiving reflections thereof from remote objects, the combination of carrier frequency signal storage means for carrier frequency storage of the signals reflected from a particular object, playback control means for repeatedly reproducing such stored signals in carrier frequency signal form in the interval between the receipt of successive reflections from such object to thereby effectively lengthen the duration of the reflected signals, and means for indicating any departure of the frequency characteristics of the reproduced signal from a predetermined value.

14. A pulse-echo object location system comprising, transmitter means for recurrently emitting short duration signals of high frequency energy, receiver means for intercepting the high frequency energy signals reflected from remote objects, means connected to said receiver means for storing signals with retention of phase characteristics of said received high frequency signals, and means reproducing said stored signals with phase coherence between successive reproduced signals.

15. A pulse-echo object location system comprising, transmitter means for recurrently emitting short duration signals of high frequency energy, receiver means for intercepting the high frequency energy signals reflected from remote objects, means connected to said receiver means for storing signals with retention of the phase characteristics of said received high frequency signals, means reproducing said stored signals with phase coherence between successive reproduced signals, narrow band combining means connected to said last named means for sequentially integrating the reproduced stored signals, and utilization means connected to said combining means indicating the presence of additive integrated signals.

16. A pulse-echo object location system comprising, transmitter means for recurrently emitting short duration signals of high frequency energy, receiver means for intercepting the high frequency energy signals reflected from remote objects, means connected to said receiver means for individually storing the short duration received signals with the phase characteristics of said received high frequency short duration signals, and playback means for reproducing each stored signal throughout substantially the entire time interval between it and a succeeding signal at a rate maintaining phase coherence between successive reproduced signals.

17. A pulse-echo object location system comprising, transmitter means for recurrently emitting short duration signals of high frequency energy, receiver means for intercepting the high frequency energy signals reflected from remote objects, means connected to said receiver means operative to individually store the short duration received signals with the phase characteristics of said received high frequency short duration signals, playback means for reproducing each stored signal throughout substantially the entire time interval between it and a succeeding signal at a rate maintaining phase coherence between successive reproduced signals, narrow band combining means connected to said playback means for integrating the reproduced stored signals, and utilization means connected to said combining means for indicating the presence of additive integrated signals.

18. A pulse-echo object location system comprising, transmitter means for recurrently emitting short duration signals of high frequency energy, receiver means for intercepting the high frequency energy signals reflected from remote objects, means connected to said receiver means operative to separately store a multiple of successive short duration received signals with the phase characteristics of said received high frequency short duration pulses, and playback means for reproducing said stored signals in closely spaced sequence with phase coherence between successive reproduced signals.

19. A pulse-echo object location system comprising, transmitter means for recurrently emitting short duration signals of high frequency energy, receiver means for intercepting the high frequency energy signals reflected from remote objects, means connected to said receiver means operative to separately store a multiple of successive short duration received signals with the phase characteristics of said received high frequency short duration pulses, playback means for reproducing said stored signals in closely spaced sequence with phase coherence between successive reproduced signals, narrow band combining means for integrating the reproduced stored signals, and utilization means connected to said combining means for indicating the presence of additive integrated signals.

20. A radio-echo object location system comprising, transmitter means for periodically emitting short duration high frequency energy signals, receiver means for intercepting the high frequency energy echo signals reflected by remote objects, first storage means for retaining the phase and frequency characteristics of the transmitted signals, control circuit means for reproducing the retained signals in coincidence with the return of echo signals from a selected range, means for altering the frequency characteristics of the reproduced signals to produce resultant signals, means mixing the received echo signals and the resultant signals to produce carrier signals with the phase characteristics of said received echo signals, second storage means for storing said carrier signals with the phase characteristics of the received echo signals, second control circuit means for reproducing said stored carrier signals with phase coherence between successive reproduced signals, narrow band combining means sequentially integrating the reproduced stored signals, and utilization means connected to said combining means for indicating the presence of additive integrated signals.

References Cited by the Examiner

UNITED STATES PATENTS

| | | | |
|---|---|---|---|
| 2,403,562 | 7/1946 | Smith | 343—11 |
| 2,410,424 | 11/1946 | Brown | 343—9.5 |
| 2,415,981 | 2/1947 | Wolff | 343—11 |
| 2,422,135 | 6/1947 | Sanders | 343—9.5 |
| 2,430,038 | 11/1947 | Wertz. | |
| 2,434,293 | 1/1948 | Stearns | 250—20.36 X |
| 2,434,294 | 1/1948 | Ginzton | 250—20.36 XR |
| 2,437,173 | 3/1948 | Rutherford | 343—9.5 X |
| 2,451,005 | 10/1948 | Weimer | 343—9.5 |
| 2,454,410 | 11/1948 | Snyder | 343—9.5 |
| 2,491,450 | 12/1949 | Holmes | 343—9.5 X |
| 2,499,941 | 3/1950 | Benfer | 343—11 |
| 2,508,408 | 5/1950 | Liebson | 250—20.5 |
| 2,512,144 | 6/1950 | Emslie | 343—9.5 |
| 2,524,296 | 10/1950 | Mesner | 343—13 |
| 2,683,191 | 7/1954 | Levy | 179—15 |

FOREIGN PATENTS

| | | |
|---|---|---|
| 610,583 | 5/1947 | Great Britain. |

CHESTER L. JUSTUS, *Primary Examiner.*

SAMUEL YAFFEE, NORMAN H. EVANS, *Examiners.*

R. S. SCIASCIA, W. W. BURNS, R. D. BENNETT, *Assistant Examiners.*